United States Patent
Pfeiffer

(10) Patent No.: US 9,409,592 B2
(45) Date of Patent: Aug. 9, 2016

(54) LIMITING DEVICE FOR THE STEERING ANGLE INPUT IN AN ELECTRICAL STEERING SYSTEM

(71) Applicant: AUDI AG, Ingolstadt (DE)

(72) Inventor: Ulrich Pfeiffer, Karlskron/Probfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/771,994

(22) PCT Filed: Feb. 12, 2014

(86) PCT No.: PCT/EP2014/000387
§ 371 (c)(1),
(2) Date: Sep. 1, 2015

(87) PCT Pub. No.: WO2014/135247
PCT Pub. Date: Sep. 12, 2014

(65) Prior Publication Data
US 2016/0009312 A1    Jan. 14, 2016

(30) Foreign Application Priority Data
Mar. 8, 2013   (DE) .......................... 10 2013 004 055

(51) Int. Cl.
B62D 5/00      (2006.01)
B60R 25/021    (2013.01)
B60R 25/0215   (2013.01)

(52) U.S. Cl.
CPC .......... *B62D 5/001* (2013.01); *B60R 25/02115* (2013.01); *B62D 5/005* (2013.01); *B62D 5/006* (2013.01); *B60R 25/0215* (2013.01)

(58) Field of Classification Search
CPC ................................. B62D 5/001; B62D 5/006
See application file for complete search history.

(56) References Cited

U.S. PATENT DOCUMENTS

| 6,481,526 | B1 | 11/2002 | Millsap et al. | |
|---|---|---|---|---|
| 2003/0146037 | A1 | 8/2003 | Menjak et al. | |
| 2003/0146038 | A1* | 8/2003 | Mills ...................... | B62D 5/001 180/422 |
| 2004/0011585 | A1* | 1/2004 | Menjak .................. | B62D 5/006 180/402 |
| 2013/0075185 | A1* | 3/2013 | Sugai ..................... | B62D 5/001 180/402 |
| 2013/0118289 | A1* | 5/2013 | Yamanaka ............... | B62D 1/16 74/492 |
| 2013/0161116 | A1* | 6/2013 | Tashiro ................ | B62D 5/0403 180/446 |
| 2013/0249252 | A1 | 9/2013 | Schmid et al. | |
| 2014/0028007 | A1 | 1/2014 | Pfeiffer | |

FOREIGN PATENT DOCUMENTS

| DE | 603 03 081 | 7/2006 |
|---|---|---|
| EP | 1 182 115 | 2/2002 |
| EP | 2 457 806 | 5/2012 |
| FR | 2 720 365 | 12/1995 |
| FR | 2 877 304 | 5/2006 |
| FR | 2 889 150 | 2/2007 |

OTHER PUBLICATIONS

International Search Report issued by the European Patent Office in International Application PCT/EP2014/000387.

* cited by examiner

*Primary Examiner* — Terence Boes
(74) *Attorney, Agent, or Firm* — Henry M. Feiereisen LLC

(57) ABSTRACT

A limiting device for the steering angle input in an electrical steering system includes a gearing that is arranged on a steering shaft to enable for a threaded piece an adjustment path corresponding to the maximum permissible number of revolutions of the steering wheel, and steering stops for limiting the adjustment path of the threaded piece. A motor-driven drive mechanism is provided for the steering stops, by which the steering stops can be moved uniformly towards or away from one another.

4 Claims, 3 Drawing Sheets

LIMITING DEVICE FOR THE STEERING ANGLE INPUT IN AN ELECTRICAL STEERING SYSTEM

CROSS-REFERENCES TO RELATED APPLICATIONS

This application is the U.S. National Stage of International Application No. PCT/EP2014/000387, filed Feb. 12, 2014, which designated the United States and has been published as International Publication No. WO 2014/135247 and which claims the priority of German Patent Application, Serial No. 10 2013 004 055.8, filed Mar. 8, 2013, pursuant to 35 U.S.C. 119(a)-(d).

BACKGROUND OF THE INVENTION

The invention relates to a limiting device for the steering angle input in an electrical steering system.

In steering systems without mechanical connection to the steering gear (steer-by-wire), a mechanical feedback is missing between steering angle input by the driver via the steering wheel and the actually executed steering angle on the wheel. The steering gear can thus also move toward the limit stops, without being noticed on the steering angle input side on the steering wheel. As a result, infinitely great steering angle wishes can thus be generated, for example a free spinning of the steering wheel, without the steering gear being able to implement these steering angle wishes. It may even result in damage to the steering system. Further, steering systems of this type have also no steering wheel blockages whatsoever, a so-called steering lock, as is expected from current steering systems for motor vehicles.

US 2003/0146038 A1 discloses a steering system for steering wheels of a motor vehicle. The steering system includes a steering wheel in order to command steering wishes to the steered wheels, and a steering shaft which is mechanically coupled to the steering wheel. A housing is disposed on the steering column. A slider element is axially slideable in the housing, and a groove is formed in the steering shaft to receive the slider element. The groove includes two end walls to limit the rotational movement of the steering wheel. Thus, a firmly defined movement or rotation range of the steering wheel is defined. A variation of the stop position is, however, not provided.

US 2004/0011585 A1 discloses a steer-by-wire steering system having a mechanical feedback device that transmits a steering feel to the driver and which has a positive stop function. For the stop function, various possibilities of rigid steering stops are disclosed, mostly by blocking gears or winding and unwinding of coil springs. A variation of the stop position is not provided.

Since in electric steering systems without mechanical connection from steering wheel to steering gear, the steering ratios on the wheel can also be changed fluidly and in fact are changed, the respective steering stops must track or be adjusted in a fully variable manner.

DE 603 03 081 T2A discloses a generic limiting device for the steering angle input in an electric steering system.

SUMMARY OF THE INVENTION

The invention is based on the object to provide a limiting device for the steering angle input in an electric steering system, with the limiting device being able to variably adjust the steer angles in both rotation directions in a simple manner.

For this purpose, the limiting device according to the invention for the steering angle input in an electric steering system is characterized by a gearing arranged on a steering shaft and allowing an adjustment path for a threaded piece in correspondence with the maximum permissible number of revolutions of the steering wheel, and by steering stops to limit the adjustment path of the threaded piece, and by a motor-operated drive mechanism for the steering stops to uniformly move the steering stops toward one another or away from one another.

The invention meets the criteria of conventional steering stops, as known from steering systems with mechanical action, for steering systems without mechanical action. Furthermore, the steering stops are fully variable and can thus be suited to the requirements of a steering system without mechanical action. In particular, when fully variable steering ratios are involved, the steering stops can be completely readjusted.

An advantageous configuration of the limiting device according to the invention is characterized in that the gearing includes a threaded bushing arranged on a steering shaft and having an external thread which engages a thread on the threaded piece, and a motor-driven gearing sleeve with right-hand and left-hand threads which engage corresponding right-hand and left-hand threads arranged on the steering stops. As a result, a smoothly running and reliable gearing is created by which the steering stops can be variably adjusted as needed.

A further advantageous configuration of the limiting device according to the invention is characterized by housing-fixed guides in the form of guide pins for non-rotational linear guidance of the threaded piece and the steering stops, thereby ensuring a simple and reliable linear guidance of the threaded piece and the steering stops.

A further advantageous configuration of the limiting device according to the invention is characterized in that, the threaded piece is driven by a servomotor via a pinion which engages an external thread of the threaded piece.

A further advantageous configuration of the limiting device according to the invention is characterized in that the gearing sleeve is bearing-mounted via slide rings in the housing halves of the limiting device, and that in particular the housing halves of the limiting device are bearing-mounted on the steering shaft via ball bearings. As a result of the bearings, a secure and smooth support of the gearing sleeve in the housing halves, on one hand, and of the housing half on the steering shaft, on the other hand, are realized, so that the support of the involved components eliminates the need for introducing an additional resistance force into the steering system.

Finally, it is advantageous that the function steering lock can be provided without additional components.

The steering wheel can be locked after removal of the ignition key or a similar ignition device. For this purpose, the steering stops are moved in a simple manner in such a way that the threaded piece is firmly clamped between the steering stops. This can easily be achieved by the control provided anyway in the steering system.

Further advantages, features and applications of the present invention will become apparent from the following description in conjunction with the exemplary embodiments illustrated in the drawings.

In the description, in the claims and in the drawing, the terms used in the below list of reference signs and associated reference signs are used. It is shown in the drawings:

DETAILED DESCRIPTION OF PREFERRED EMBODIMENTS

Figure 1:
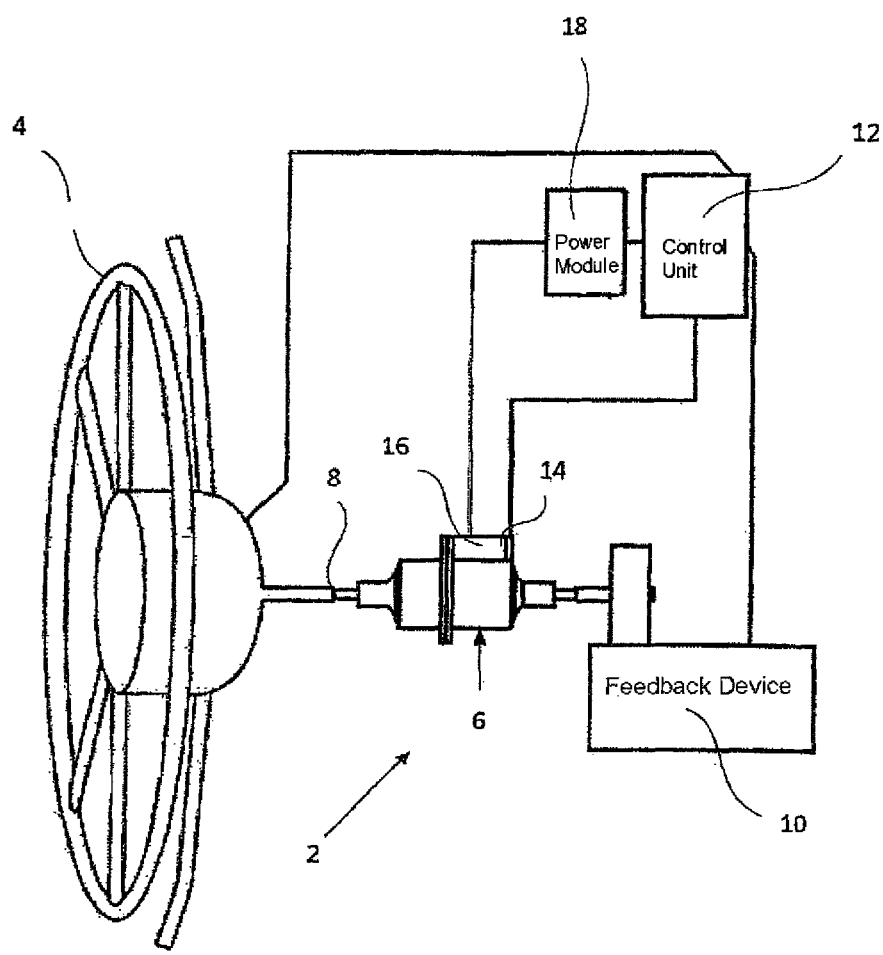
FIG. 1 a schematic illustration of a steering-wheel-side portion of a steering system without mechanical action.

FIG. 1 shows a schematic illustration of a steering-wheel-side part 2 of a steering system without mechanical action, wherein the wheel-side part of the steering system is not shown for sake of simplicity, since conventional components are hereby involved. The steering-wheel-side part 2 of the steering system includes a steering wheel 4 and a limiting device 6 for the steering angle input, which are arranged on a steering shaft 8, as well as a feedback device 10, provided to convey to an operating person a steering feel as perceived in mechanical steering systems.

The limitation device 6 and the device 10 are controlled by a control unit 12 which receives inputs from the steering wheel 4 and from a rotary sensor 14 on the limiting device 6, with the rotary sensor 14 scanning the rotation movement of a motor 16 which is provided for adjustment of the limitation for the steering angle input.

Figure 2:
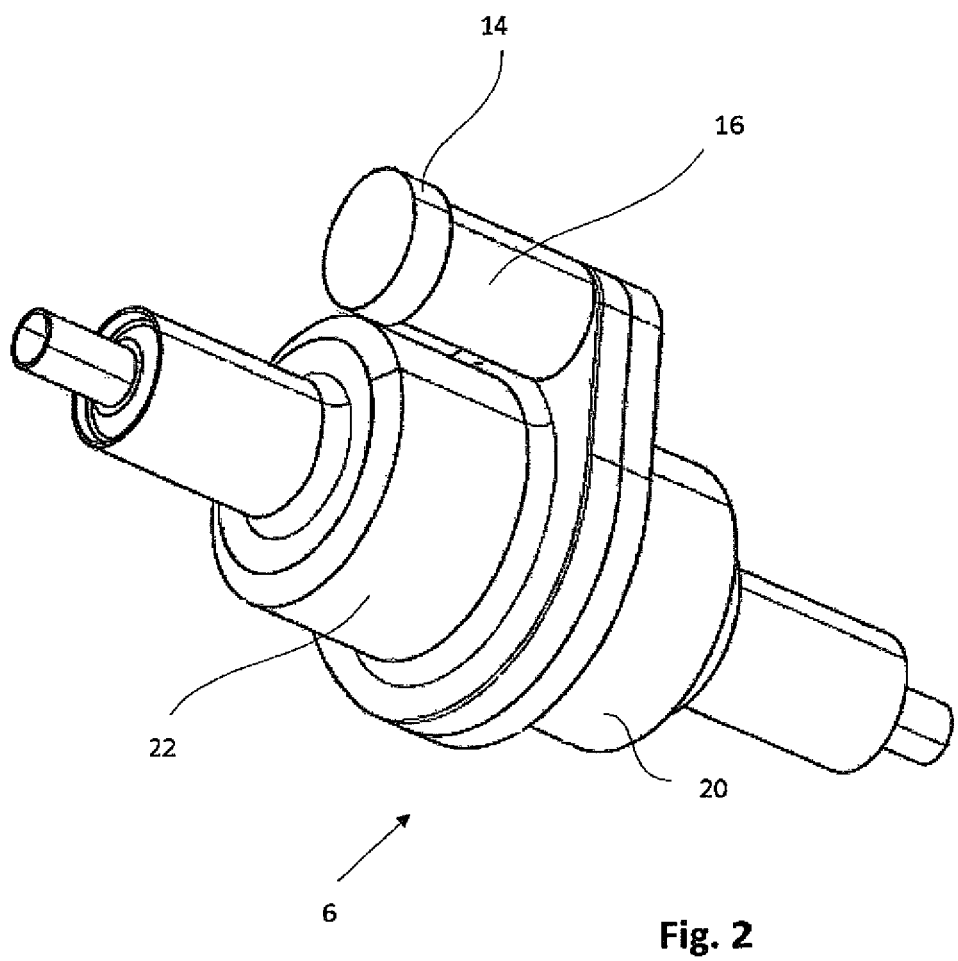
FIG. 2 a perspective plan view of an exemplary embodiment of a limiting device for an electrical steering system, and FIG. 3 a sectional view of the limiting device of FIG. 2.
Figure 3:
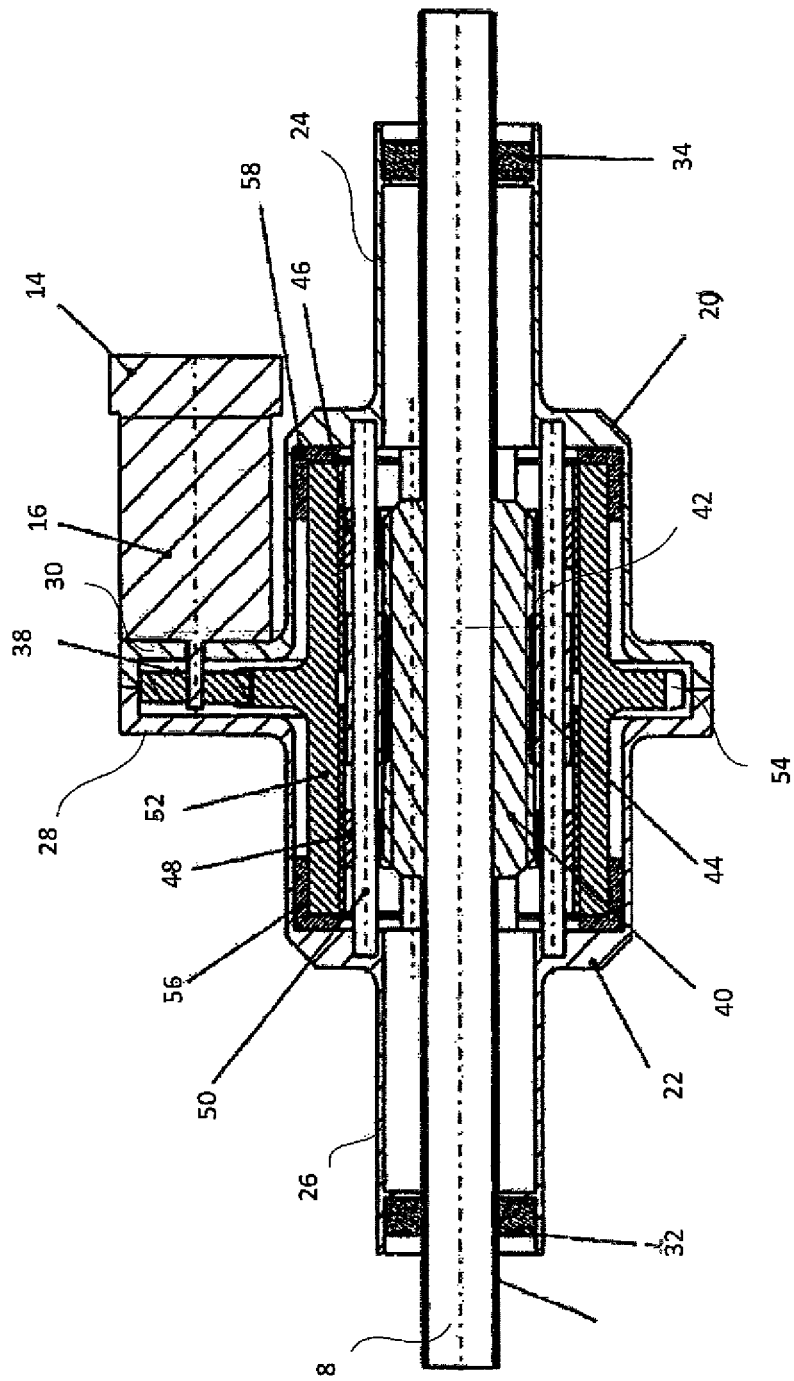

As shown in FIGS. 2 and 3, the limiting device 6 includes a housing which is composed of two housing parts 20, 22. The housing parts 20, 22 have tubular extensions 24, 26 which are bearing-mounted on the steering shaft 8 via ball bearings 32, 34. The housing parts 20, 22 accommodate the gearing of the limiting device 6 and have radial shoulders 28, 30 to which the motor 16 is secured. The motor 16 drives a pinion 38, which drives the gearing of the limiting device 6.

In the following, the structure of the gearing of the limiting device 6 will be described.

A threaded bushing 40 is secured to the steering shaft 8 and has an external thread 42 with a pitch to enable for a threaded piece 44 an adjustment path which corresponds to the maximum permissible number of revolutions of the steering wheel 4. The path of the threaded piece 44 is limited by steering stops 46, 48. The steering stops 46, 48 and the threaded piece 44 are guided by the housing-fixed guide pins 50 and secured against rotation. Thus, these components move linearly in alignment with the steering shaft 8.

The steering stops 46, 48 are adjusted via the driven gearing sleeve 52. The gearing sleeve 52 includes a right-hand and a left-hand thread. The steering stops 46, 48 also have the corresponding right-hand thread and left-hand thread. As a result, the steering stops 46, 48 move uniformly toward one another or away from one another as the threaded sleeve 52 is rotated.

The gearing sleeve 52 has outer teeth 54 in which the pinion 38 of the drive motor 16 engages, so that the gearing sleeve 52 can be rotated by the drive motor 16. The gearing sleeve 52 is bearing-mounted in axial and radial directions in two slide rings 56, 58, which are placed in the housing parts 20, 22 by a press fit. The steering shaft 8 is supported in the housing halves 28, 30 by the ball bearings 32, 34.

The force flux upon reaching one of the steering stops 46, 48 is from the steering shaft 8 via the threaded bushing 40, the threaded piece 44 to the steering stops 46, 48. From there, the power flux continues to the threaded sleeve 52, which is supported on the respective housing halves 20, 22 via the sliding bearings 32, 34. A further movement of the steering shaft 8 and thus of the steering wheel 4 is therefore prevented by the impact against the steering stops 46, 48.

Since all the forces are supported via the threads and the housing of the limiting device 6, the drive motor 16 is provided only for non-load adjustment of the steering stops 46, 48 and can thus be dimensioned small and in an energy-saving manner.

In order to reliably detect the position of the steering stops, the revolutions of the drive motor 16 are counted by the rotary sensor 14. These revolutions have a constant correlation to the position of the steering stops 46, 48 via the translation of the gearing sleeve 52 and the pinion 38 and the known pitches of the threads in the gearing sleeve 52 and the steering stops 46, 48. This correlation is calculated in the control unit 12, which, for this purpose, has the values transmitted thereto.

In order to illustrate the function steering lock or steering-wheel blockage, the steering wheel 4 is first brought by the force-feedback drive to neutral position. When this position has been reached, this information is communicated to the control unit 12, and the control unit 12 activates via the power module 18 the drive motor 16. The drive motor 16 drives the gearing sleeve 52 and thereby jointly moves the steering stops 46, 48, so that the latter firmly clamp the threaded piece 44 in the middle position. As a result, steering movements in all directions are thus securely blocked.

The control unit 12 further ensures that the steering-wheel lock cannot be triggered when the ignition key is not inserted. A logic circuit can also ensure this (redundancy), by precluding a closing of the steering stops 46, 48 in conjunction with inserted ignition key. This prevents that numbers of revolution that are outside the permitted values during travel are not implemented by the drive motor 16. Thus, a permanent plausibility check of the desired and actual positions of the steering stops 46, 48 and a query of the ignition key position take place.

The invention claimed is:

1. A limiting device for a steering angle input in an electric steering system, said limiting device comprising:
    a housing having housing halves;
    a gearing arranged on a steering shaft, said gearing including a threaded piece, a threaded bushing which is arranged on the steering shaft and has an external thread in engagement with a thread of the threaded piece to provide for the threaded piece an adjustment path which corresponds to a maximum permissible number of revolutions of a steering wheel, and a gearing sleeve having right-hand and left-hand threads;
    steering stops for limiting the adjustment path of the threaded piece, said steering stops having right-hand or left-hand threads in engagement with the right-hand and left-hand threads of the gearing sleeve;
    a motor operably connected to the gearing sleeve to uniformly move the steering stops toward each other or apart from one another; and
    slide rings supporting the gearing sleeve in the housing halves of the housing.

2. The limiting device of claim 1, further comprising housing-fixed guides for non-rotational linear guidance of the threaded piece and the steering stops.

3. The limiting device of claim 1, wherein the gearing includes a pinion in engagement with an external thread of the gearing sleeve, said motor being a servomotor configured to drive the gearing sleeve.

4. The limiting device of claim 1, further comprising ball bearings to support the housing halves of the housing on the steering shaft.

\* \* \* \* \*